S. ROSENFELD.
BUSHING.
APPLICATION FILED JULY 6, 1915.
1,248,721.
Patented Dec. 4, 1917.
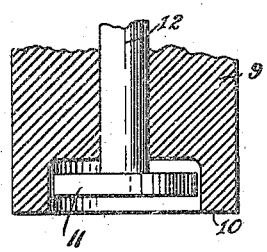
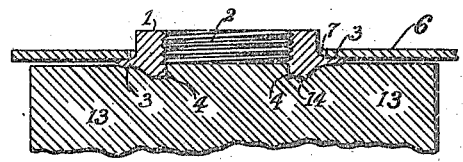
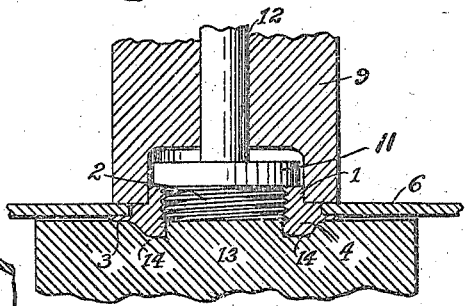
Fig. 2
Fig. 4
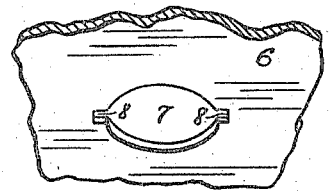
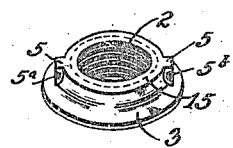
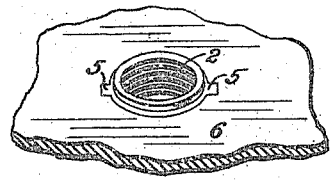
Fig. 1
Fig. 5
Inventor
Sidney Rosenfeld
By Hull, Smith, Buck & West
Attys.

UNITED STATES PATENT OFFICE.

SIDNEY ROSENFELD, OF CLEVELAND, OHIO.

BUSHING.

1,248,721.  Specification of Letters Patent.  Patented Dec. 4, 1917.

Original application filed October 1, 1914, Serial No. 864,420. Divided and this application filed July 6, 1915. Serial No. 38,086.

*To all whom it may concern:*

Be it known that I, SIDNEY ROSENFELD, a citizen of the United States, residing at Cleveland, in the county of Cuyahoga and State of Ohio, have invented a certain new and useful Improvement in Bushings, of which the following is a full, clear, and exact description, reference being had to the accompanying drawings.
This invention relates to bushings and to the manner of forming the connection between such bushings and the coöperating metallic supporting members therefor (such as the bodies or heads of barrels, kegs or cans) whereby a close, non-leaking connection may be formed between such bushings and the surrounding metal bodies and whereby this connection may be formed in a particularly economical and efficient manner. The application herein is a division of my application No. 864,420, filed October 1, 1914.

In the drawings forming part hereof, Figure 1 represents a perspective view of my bushing prior to its application to the coöperating metal body; Fig. 2 a perspective view of the metal body as prepared for the reception of the bushing; Figs. 3 and 4 details in section illustrating the manner in which the bushing is secured in place; and Fig. 5 a perspective view of the bushing and the surrounding metal body to which it is united.

While the invention disclosed herein is capable of general application wherever it may be desirable to unite a hollow or tubular article to a metal sheet or body, it is particularly useful where the tubular body is a bushing and where such body is internally threaded for the reception of an externally threaded body, such as a faucet or a plug; since, through the manner of uniting the bushing to the metal body, not only is a tight or leak-proof joint provided between the exterior surface of the bushing and the metal body, but this connection is not endangered through the rotary or torsional strain which may be applied to the bushing through the screwing or unscrewing of the faucet therewithin.

Describing by reference characters the various parts illustrated herein, 1 represents the body or neck of an internally threaded bushing, the internal thread being represented at 2. The bushing is provided with a base flange 3 projecting therefrom intermediate of the ends thereof. For convenience of description, it will be assumed that the bushing occupies a position wherein the threaded bore will extend in a vertical direction, and the terms "top", "bottom", "upper" and "lower" will be used in accordance with this assumption, it being understood, however, that I do not propose thereby to limit the use of the bushing to such vertical position of the bore or axis. The outer surface of the bushing is concaved from the top thereof to the outer edge of the flange 3, whereby there will be a progressive diminution in the thickness of the body from the flange 3 to the upper end of the body. The bottom of the bushing body extends below the flange, as shown at 4. The outer wall of the bushing is substantially concentric with the inner wall, with the exception that a suitable number of ears or lugs 5 are provided, which lugs or ears project laterally beyond the outer wall and preferably extend from the top of the bushing body to and merge with the flange 3. These lugs or ears are preferably of the shape shown in Fig. 1, having a vertical outer face $5^a$ and vertical side faces $5^b$, the face $5^a$ being preferably parallel with the axis of the bushing and the faces $5^b$ being shown as substantially parallel to each other—although any other angular form may be given to these lugs or ears.

6 denotes a metallic shell or body to which the bushing is to be applied. This shell or body may be the head or curved side of a barrel or keg, or any other article. The metal body 6 is shown as having an aperture 7 therein, said aperture being preferably circular and of slightly greater diameter than the diameter of the bushing adjacent to the flange 3. The aperture 7 is provided with lateral notches or recesses 8 corresponding in shape to the lugs or ears 5 and adapted to receive the same. As many lugs or ears and corresponding notches or recesses will be provided as occasion may require, two such lugs or ears and two such notches or recesses being shown.

With the parts arranged as described, the bushing may be conveniently connected to the metal body 6 in the manner illustrated in the drawings, wherein 9 denotes a movable die member having a circular opening in the lower face thereof, said opening being preferably of a diameter intermediate between the inner and the outer diameter of the bushing body 1. The bottom of the die 9 is flat or plane as indicated at 10. This die member 9 is provided with a reciprocable plunger 11 having an operating rod or stem 12. 13 denotes the fixed or bottom member of the die, said die having an annular recess 14 which is adapted to receive the lower portion of the flange 3 of the bushing and the part of the bushing body thereneath, indicated at 4.

In operation, the bushing will be inserted into the opening 7 of the metal plate with the lugs or ears 5 within the corresponding recesses 8 and the top of the flange 3 against the bottom of the plate or body 6. The bushing and plate will then be applied to the die member 13 in the manner shown in Fig. 3. The die head 9 will then be forced downwardly, whereupon the inner edge of the bottom face 10 of this die will engage the outer portion of the top of the bushing body 1, along the dotted line 15 shown in Fig. 1. This will result in forcing the outer portion of the bushing body downwardly and outwardly, the die member 9 exercising a sort of shearing action on the metal at the exterior portion of the body 1 and spreading it into close engagement with the wall of the aperture 7 in the plate 6, and also spreading the lugs or ears 5 outwardly in like manner, but without affecting the internal diameter of the bushing. The aperture 7, the height and outer diameter of the bushing body 3, and the internal diameter of the guide member 9 will be such that, when this member strikes the plate 6 (as shown in Fig. 4) the metal forming the outer portion of the bushing will have been spread outwardly to completely fill and tightly fit against the wall which bounds and defines the aperture 7. The walls or faces of the lugs 5 will be forced in like manner into tight engagement with the walls of the notches 8 and a tight and leak-proof joint will be formed between the bushing and the surrounding metal plate. Furthermore, because of the interlocking between the lugs 5 and the notches 8, this joint will not be disturbed through the torsion exerted upon the bushing by threading a body thereinto. Should the bushing member adhere too closely to the movable die member, the plunger rod 12 may be operated to disengage these parts.

From the foregoing description it will be apparent that I have produced a bushing and a mode of connecting the same to a surrounding metal body which will enable the connection to be made in a particularly efficient and economical manner.

Having thus described my invention, what I claim is:—

1. The combination, with a metal plate having an aperture with one or more laterally projecting notches, of a bushing having a flange adapted to engage one surface of the plate and having one or more lugs corresponding to the notch or notches, the metal of the bushing body being expanded outwardly into locking engagement with the wall defining the aperture in the metal plate, with the lug or lugs engaging the metal bounding the notch or notches.

2. The combination, with a metal plate having an aperture provided with one or more laterally projecting notches, of a bushing having a flange and a body, the flange being adapted to engage one surface of the plate and the body being adapted to extend through the aperture in the plate and provided with one or more lugs corresponding to and adapted to enter the notch or notches, the metal at the outer portion only of the bushing body being expanded outwardly into locking engagement with the wall defining the aperture in the metal plate, and the lug or lugs being expanded into close engagement with the metal bounding the notch or notches.

3. The combination, with a metal plate having an aperture therethrough, of a bushing having a flange and a body, the flange being adapted to engage one side of the plate adjacent to the aperture and the body being adapted to extend through the aperture in the plate, the metal at the outer portion only of the bushing body being expanded outwardly into locking engagement with the wall defining the aperture in the metal plate.

In testimony whereof, I hereunto affix my signature in the presence of two witnesses.

SIDNEY ROSENFELD.

Witnesses:
  WM. S. BAYER,
  JOHN H. REIK.

Copies of this patent may be obtained for five cents each, by addressing the "Commissioner of Patents, Washington, D. C."